ated Apr. 27, 1971

United States Patent Office 3,576,901
Patented Apr. 27, 1971

3,576,901
METHOD OF MODIFYING A ZEOLITE
George T. Kokotailo and John F. Charnell, Woodbury, N.J., assignors to Mobil Oil Corporation
No Drawing. Filed Sept. 20, 1968, Ser. No. 761,301
Int. Cl. C07c 5/18; C01b 33/28
U.S. Cl. 260—683.3
17 Claims

ABSTRACT OF THE DISCLOSURE

A method for treating a zeolitic composition in its ammonium form which comprises contacting said zeolite with a metal salt under solid-state conditions.

BACKGROUND OF THE INVENTION

Field of the invention

This invention relates to solid state treatment of zeolitic compositions. More particularly, this invention relates to solid state treatment of ammonium zeolites.

Discussion of the prior art

Zeolitic materials both natural and synthetic are characterized by having an ordered structure which is porous and crystalline, as determined by X-ray diffraction, in which there are a large number of small cavities which are interconnected by a series of still smaller channels or pores. These cavities and pores are precisely uniform in size within a specific zeolite. In the case of a crystalline aluminosilicate zeolite, the aluminosilicate tetrahedra are arranged within the crystalline structure to define cage-like structures.

In the ion exchange of the zeolites, the exchanging cation replaces alkali metal in the zeolite and occupies a position substantially the same as that occupied by the exchanged cation. In certain cases, it may be desirable to place within sodalite cages of the zeolite an amount of an anion which cannot be done by available ion exchange techniques.

SUMMARY OF THE INVENTION

A method for treating an ammonium zeolite which comprises contacting said zeolite with a metal salt under solid state conditions.

DISCUSSION OF PREFERRED EMBODIMENTS

As indicated above, it is an object of the present invention to treat ammonium zeolites to place within the cages of the zeolite an anion by a technique which performs a function which available ion exchange techniques are incapable of performing. Zeolites which can be treated in accordance with the present invention include all of the known zeolites especially synthetic zeolites A, Y, L, D, R, S, T, Z, E, F, Q, U, X. Among the natural zeolites which can be treated in accordance with the present invention are the following: gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. These zeolites are treated in an ammonium form.

Metal salts which can be utilized include metals of the Periodic Table. These metals are in a salt form such as a halide, e.g., a chloride or a bromide, sulfide, a nitrate, a sulfate or a selenide. By treating the zeolite with one of these salts under solid state conditions, the anion is caused to enter the cage of the zeolite and to plug the same. In certain instances depending upon the amount of metal salt employed, a portion of the metal cation also enters the cages. Thus, when an ammonium zeolite X is treated under solid state conditions with sodium bromide, the cages of the zeolite are plugged with both sodium and bromide ions. The plugging sodium and bromide ions prevent additional ions from entering the cages of the zeolite.

The treatment can be performed on the ammonium zeolite at a temperature sufficient to cause evolution of the ammonium salt formed during the exchange while, at the same time, driving excess salt anion into the zeolite. A portion of the original ammonium cations may be permitted to remain on the zeolite by using less than a stoichiometric amount of metal salt. This enables a substantial portion of the pores of the zeolite to be plugged while leaving other sites available for ion exchange in accordance with known techniques.

The solid state treatment occurs generally at a temperature of at least 150° C. and preferably at a temperature between 400° C. and 700° C. While the temperature can be below 150° C. under certain instances, insufficient cage plugging with the anion is provided at temperatures substantially below 150° C. On the other hand, if the temperature exceeds 800° C. degradation or collapse of the zeolite can occur and no appreciable benefit is gained by operating at temperatures above that limit. In the case of metal salt treatment of the ammonium zeolite, the temperature functions to remove the ammonium salt having the anion of the metal salt employed. Thus, when an ammonium zeolite X is treated with sodium bromide, ammonium bromide is formed which, under the conditions of solid state treatment, is driven off. The remaining product is zeolite X in which a major amount of the cages contain plugged bromide ions. The electrovalence of the zeolite is balanced by the presence of sodium.

Generally speaking, the solid state treatment of zeolite with the metal salt is continued for a period of time sufficient to bringing about substantially complete inclusion of the anion of the metal salt in the zeolite. Generally, this means a contact time between about one hour and twenty-four hours, preferably at least five hours. Utilization of any longer period of time is not harmful and only serves to further ensure that the maximum number of cages have been plugged with the anion.

EXAMPLE 1

Equimolar proportions, based upon aluminum, of ammonium exchange zeolite X having a pore diameter of about 13 angstroms and sodium iodide were mixed by grinding in a mortar and pestle, and heated in a test tube at 620° C. for 16 hours. The appearance of intense purple vapors gave evidence of iodine evolution. The presence of iodine in the product was shown by chemical analysis which revealed:

| | Weight percent |
|---|---|
| Na | 11.56 |
| $SiO_2$ | 47.18 |
| $AlO_2$ | 36.18 |
| Iodine | 5.08 |

It sorbed 16.8 grams per 100 grams zeolite of water and 11.9 grams per 100 grams zeolite of cyclohexane. X-ray analysis revealed significant changes in the diffraction pattern from that of 13X indicating that an ordered inclusion complex has been formed. A crystallographic study placed the position of the iodine within the cubo-octahedra cages. The resultant zeolite may be thought of as 13X that has been modified by (1) partial conversion to the hydrogen form (2) probable formation of a defect structure that may be of the dehydroxylated type and (3) passage of the sodium iodide, possibly as HI, into the cubo-octohedra of the zeolite.

EXAMPLE 2

A zeolite X containing sodium and iodine in which at least a portion of the cages of the zeolite were plugged with iodide anions was prepared by grinding together with mortar and pestle equal equivalent of ammonium zeolite X powder prepared from ammonium chloride exchanging of Linde X and sodium iodide. The mixture was placed in a test tube consuming about half of the volume of the tube was stoppered lightly with glass wool. The tube was laid horizontally in an oven at 480° C. It was removed after a period of 16 hours, water washed and dried at 100° C. The composition analyzed as follows:

| | Weight percent |
|---|---|
| Na | 11.8 |
| $SiO_2$ | 48.2 |
| $Al_2O_3$ | 31.9 |
| I | 3.0 |

Iodide anions were caused to enter the cages of the zeolite X. The material is receptive to subsequent exchange of the sodium cations. A portion of the ammonium cations were driven off as ammonium iodide. Other ammonium cations were converted to hydrogen and ammonia; the latter of which was driven off from the zeolite.

EXAMPLE 3

9.5 grams of ammonium erionite, which was prepared by room temperature exchange of natural erionite with a 5.0 normal ammonium chloride, was mixed with 4 grams of sodium iodide and then heated at 480° C. for 16 hours followed by water washing as in Example I. The cages of the zeolite were plugged with iodide anions. The composition analyzed as follows:

| | NaI erionite | $NH_4$ erionite | Erionite |
|---|---|---|---|
| Compositions, weight percent: | | | |
| Na | 6.67 | 0.12 | 3.3 |
| $SiO_2$ | 65.5 | 74.5 | 66.8 |
| $Al_2O_3$ | 14.5 | 17.4 | 15.4 |
| I | 1.7 | | |
| Fe | 1.86 | 2.05 | 1.95 |
| K | 2.75 | 2.13 | 3.7 |
| Ca | 0.40 | 0.47 | 2.99 |
| Mg | 0.69 | 0.49 | 0.57 |
| N | Nil | 2.52 | Ni |

It was tested for dehydrogenation activity by passing over it propane at the rate of 10 cc./min./cc. of catalyst (apparent residence time, 6 seconds). Two more tests were made passing the propane through an iodine pot first at 23° C. ($I_2$ vapor pressure 0.3 mm.), then at 100° C. ($I_2$ vapor pressure 45.5 mm.).

| | Mole ratio, $I_2$ propane | | | | | |
|---|---|---|---|---|---|---|
| | Nil | | 1/2,530 | | 1/16 | |
| Propane conv., mole percent to | Cracked products | $C_3^=$ | Cracked products | $C_3^=$ | Cracked products | $C_3^=$ |
| Temperature, °F.:[1] | | | | | | |
| 850 (454° C.) | 0.1 | Nil | 0.1 | Nil | 0.3 | 1.6 |
| 900 (482° C.) | 0.1 | Nil | 0.1 | Nil | 0.1 | 0.9 |
| 950 (510° C.) | 0.1 | Nil | 0.1 | Nil | 0.1 | 1.2 |
| 1,000 (538° C.) | 0.1 | Nil | 0.2 | 0.5 | 0.3 | 2.4 |
| 1,050 (566° C.) | 0.6 | Nil | 0.6 | 0.7 | 0.9 | 4.0 |
| 1,100 (593° C.) | 0.4 | Nil | 1.3 | 1.4 | 2.8 | 8.6 |
| 1,150 (621° C.) | 3.0 | 2.6 | | | 8.2 | 13.4 |
| 1,200 (649° C.) | 7.4 | 6.1 | | | 13.9 | 18.7 |
| 1,250 (677° C.) | 15.8 | 12.2 | | | 23.4 | 22.8 |
| 1,300 (704° C.) | 26.2 | 16.8 | | | 31.4 | 29.6 |

[1] 15 minutes run time at each temperature.

The blank run shows that essentially no reaction takes place up to 593° C. and then cracking predominates over dehydrogenation to propylene. An $I_2$ propane mole ratio of 1/2,530 is too low to accelerate reaction appreciably, but at 1/16 both cracking and dehydrogenation are accelerated (dehydrogenation by reaction of propane with $I_2$, cracking by acid catalysis from by-product HI).

EXAMPLE 4

An intimate mixture of ammonium erionite and nickel chloride was heated at 550° C. for 20 hours to form the nickel erionite. After dehydration the product had the following adsorptive capacity; 7.8 percent water, 0.7 percent cyclohexane and 0.5 percent normal hexane. The chloride anions entered the cages of the zeolite.

EXAMPLE 5

An intimate mixture of ammonium Linde X and magnesium chloride calcined 20 hours at 550° C. yielded a magnesium form of the zeolite which after dehydration had the following adsorptive capacity; 20.2 percent water, 10.5 percent cyclohexane and 8 percent normal hexane. The chloride anions entered the cages of the zeolite.

EXAMPLE 6

An intimate mixture of ammonium Linde Y and lithium chloride was calcined for 20 hours at 550° C. to yield lithium Linde Y. After dehydration the product, LiY, had the following adsorptive capacity; 28.8 percent water, 18.3 percent cyclohexane and 16.8 percent normal hexane. The chloride anions entered the cages of the zeolite.

The method of the present invention can be employed in treating ammonium metal aluminosilicates to prepare improved catalysts having hydrogenation-dehydrogenation activity. Other advantages of the present invention will be apparent to one skilled in the art. Additionally, products of the process of the present invention can suitably be used as adsorbents or desiccants. For instance, the treated zeolites can be used to purify hydrocarbon streams en route to a reaction where the adsorbent properties of the zeolite serve to remove from the hydrocarbon stream products which are normally undesirably present during the hydrocarbon conversion. The thermal stability of these materials enables them to be readily desorbed on a continuous basis.

The terms and expressions used herein have been used for purposes of illustration and not of limitation as there is no intention, in the use of such terms and expressions, of excluding any equivalents, or portions, thereof, as many modifications and departures are possible in the scope of the invention claimed.

What is claimed is:

1. A method for treating an ammonium zeolite which comprises contacting said zeolite with a metal salt the anion of which is capable of entering the cages of the zeolite under solid state conditions, said conditions comprising treatment at a temperature sufficient to cause evolution of ammonia while, at the same time, effecting insertion of the anion into the zeolite.

2. A method according to claim 1, wherein said zeolite is contacted with said metal salt at a temperature of at least 150° C.

3. A method according to claim 1, wherein said zeolite is contacted with said metal salt at a temperature between 400 and 700° C.

4. A method according to claim 3, wherein said zeolite is ammonium erionite.

5. A method according to claim 4, wherein said metal salt is sodium iodide.

6. A method according to claim 4, wherein said metal salt is nickel chloride.

7. A method according to claim 3, wherein said zeolite is ammonium zeolite X.

8. A method according to claim 7, wherein said metal salt is magnesium chloride.

9. A method according to claim 3, wherein said zeolite is ammonium zeolite Y.

10. A method according to claim 9, wherein said metal salt is lithium chloride.

11. A method for simultaneously cracking and dehydrogenating a hydrocarbon charge which comprises contacting said hydrocarbon charge in a reaction zone under hydrocarbon charge conditions with a catalyst prepared by the process of claim 1.

12. A process according to claim 11, wherein a halogen is added to said hydrocarbon charge.

13. A process according to claim 12, wherein said halogen is iodine.

14. A composition prepared by the method of claim 1.

15. A composition prepared by the method of claim 4.

16. A composition prepared by the method of claim 7.

17. A composition prepared by the method of claim 9.

References Cited

UNITED STATES PATENTS

| | | | |
|---|---|---|---|
| 3,126,426 | 3/1964 | Turnquest et al. | 260—683.3 |
| 3,354,078 | 11/1967 | Miale et al. | 208—120 |
| 3,383,431 | 5/1968 | Fishel | 260—683.3 |
| 3,403,108 | 9/1968 | Leftin et al. | 252—429 |

DELBERT E. GANTZ, Primary Examiner

G. E. SCHMITKONS, Assistant Examiner

U.S. Cl. X.R.

252—442, 455

PO-1050
(5/69)

UNITED STATES PATENT OFFICE
CERTIFICATE OF CORRECTION

Patent No. 3,576,901      Dated April 27, 1971

Inventor(s) George T. Kokotailo and John F. Charnell

It is certified that error appears in the above-identified patent and that said Letters Patent are hereby corrected as shown below:

Column 3, Line 38,     "2.75" should be --2.73--.
Column 3, Line 40,     "Ni"    should be --Nil--.
Column 3, Line 74,     "Afted" should be --After--.

Signed and sealed this 24th day of August 1971.

(SEAL)
Attest:

EDWARD M. FLETCHER, JR.            WILLIAM E. SCHUYLER, JR.
Attesting Officer                   Commissioner of Patents